Patented June 11, 1940

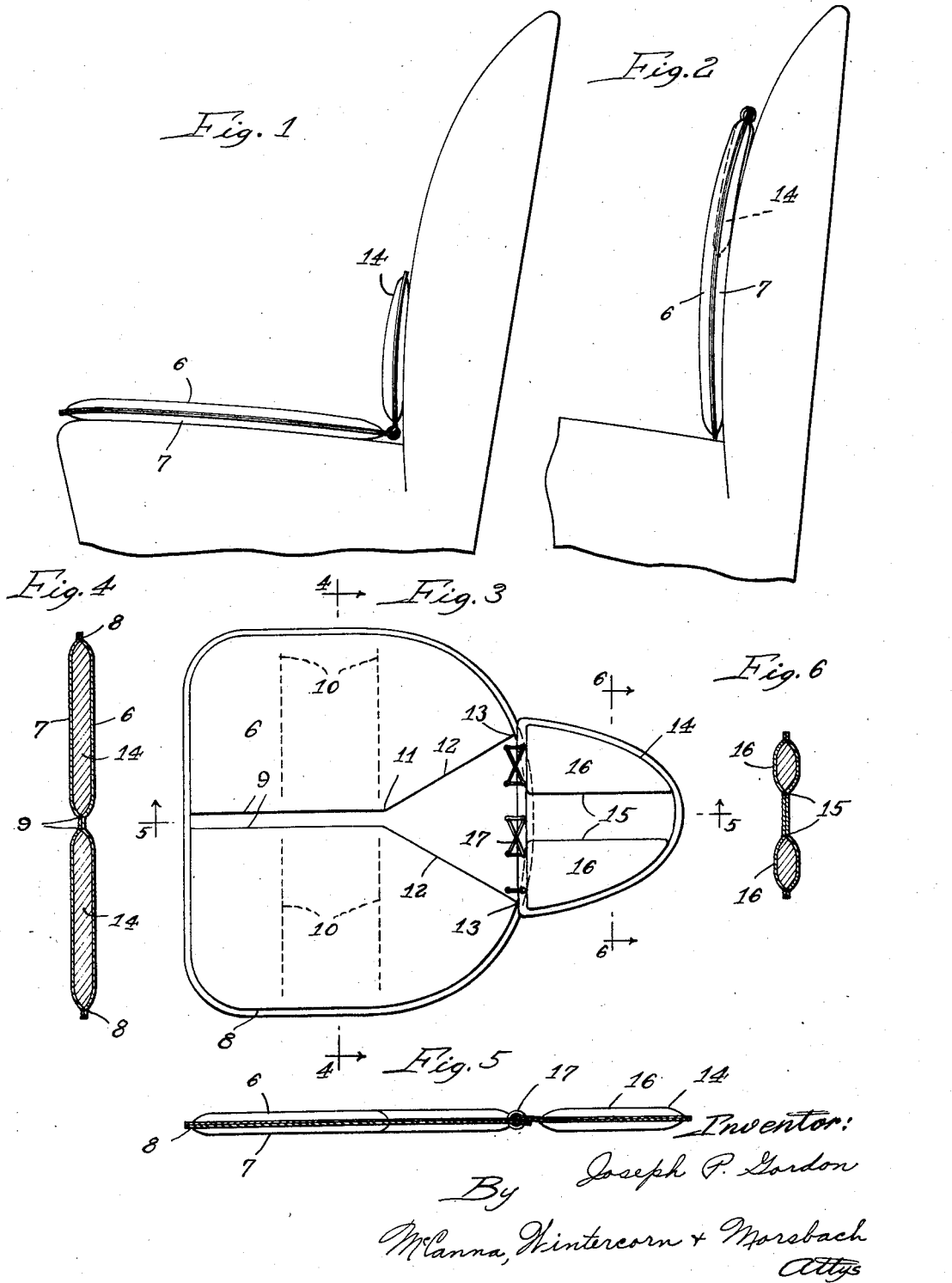

2,204,449

UNITED STATES PATENT OFFICE 2,204,449

SEAT CUSHION

Joseph P. Gordon, Rockford, Ill.

Application June 17, 1938, Serial No. 214,199

7 Claims. (Cl. 155—182)

This invention relates to seat cushions adapted for ordinary chairs and for use in automobiles and other motor vehicles. In the case of automobile driving particularly over long and continuous periods, disorders and troubles are caused by pressure, strain, and irritation of the lower sacral nerves and not infrequently the conditions incidental to such driving cause injury to the prostate and the coccyx. From these injuries many troubles are apt to develop.

The principal object of my invention is to provide an improved seat cushion having certain padded areas and certain relief areas designed to give comfortable support to the body and at the same time relieve pressure from certain areas in such manner as to avoid injuries to delicate and vital parts under the conditions incidental to road driving or any driving over long periods. While my improved seat cushion is particularly beneficial for use on motor vehicle seats, it is not limited to this use but is generally applicable as a chair seat cushion.

Another object is to provide a seat cushion of the character described which is conveniently foldable so that it may be easily carried about and handled.

Another object is to provide a cushion of the kind described having a back rest pad which serves a particularly useful purpose in providing support for the lower posterior of the body when in the seating posture and which also serves advantageously when the cushion is used as a back rest. In this use the auxiliary pad or cushion is folded back behind the cushion proper and serves to maintain the cushion in a better supporting position when used as a back rest.

Another object is to provide a cushion of the character described which is reversible so that either side may be used as the top or front. This not only increases the life of the cushion but permits the use of different materials on the face of the opposite sides and, in effect, provides two cushions in one.

Another object is to provide a cushion of the kind described which may be economically manufactured and which will serve in a practical and satisfactory manner the purposes intended.

Other objects and attendant advantages will be appreciated as the invention becomes better understood by reference to the following description when considered in connection with the accompanying drawing, in which—

Figure 1 is a side elevation of a seat cushion embodying my invention, as applied to the seat of a motor car;

Fig. 2 shows the cushion applied as a back rest;

Fig. 3 is a top view of the cushion proper and the back rest attachment in a flat plane; and Figs. 4, 5, and 6 are sections taken on the section lines 4—4, 5—5, and 6—6, respectively, of Fig. 3.

In the embodiment of my invention herein illustrated the cushion proper is composed of opposite, identical face members which I have designated top and bottom members 6 and 7, respectively, each member being of a shape and size corresponding approximately with the top of an ordinary chair seat so as to be adapted for use on an individual chair or on either a single or a double seat of an automobile. These members are of material suitable for the purpose and I prefer to employ a waterproof fabric having high wear-resisting quality. My invention also contemplates the use of different materials such as matting and leather and fabricated materials and to use different materials on the opposite sides so as to provide a two-fold purpose while utilizing the structural advantages when the cushion is used on either side. By this I mean that in addition to the use of different materials on the opposite sides, the structural advanages of the padded and relief areas hereinafter more fully described are obtainable on either side of the cushion, consequently giving the choice and wear effect of two cushions each having a different face material. Furthermore, said members 6 and 7 are stitched together marginally at 8 and also medially at 9 from the front of the seat to a point beyond the center as at 11 and thence in diverging lines 12 to the rear edge at 13. The two double areas defined by the stitching or seams 8, 9, 12 and 13 are filled with suitable padding material 14 to provide definite padded areas which cooperate with the unpadded areas in a particularly advantageous manner. The V-shaped area defined by the numerals 11, 12 and 13 is substantially unpadded and provides definite relief for certain vital parts of the body when the user is in a sitting posture. A narrow relief area is also carried forwardly from the point 11 to the front of the cushion as defined by the seams 9. The stitching or seams in addition to forming the areas described also serve to prevent the padding material from slipping or being displaced from the desired location under pressures incidental to use, although with certain padding material I prefer to stitch the padding as at 10 where from the character of the padding there may be a tendency to shift. Among the materials well suited for my invention are hair and kapok. The stitching 9, 11 and 12 and the arrangement of the padding and relief areas also provide for folding the cushion with one-half section upon the other for convenience in handling, carrying, and packing into a small space without injury to the shape or structure of the cushion. In use, the unpadded portion of the cushion which is characterized by a definite Y-shaped relief area, gives protection to all organs in the enclosed area and the padded parts prevent too much pressure concentration on the bony structure. This is particularly advantageous in driving a car long distances and to those having sedentary occupations. In the case of constant car driving the use of the legs in operating the brake and clutch pedals puts an unusual strain on the coccyx bone structure and causes it to press on the rectum and also to irritate the lower sacral nerves. Not only this action but the normal presures from the weight of the body over long periods of sitting is apt to cause irritation of the delicate tissues in this region and this is relieved by the support provided by the padded and relief areas above described. I have found that many troubles and derangements develop from excessive pressures and irritations of the kind described. My invention tends to obviate these conditions and provides such support as to avoid or minimize troubles of this character and also to provide improved support for normal conditions.

My invention also contemplates the provision of an auxiliary cushion pad designated generally by 14 hinged to the rear edge of the cushion proper across the unpadded area at 13—13. This pad is of the same general construction characteristics as the cushion proper except that the seams 15 are spaced farther apart than the seams 9 and they are substantially parallel from end to end instead of diverging at the rear end. This provides padded portions of general V-shape adapted to fit into and substantially fill the unpadded area 11, 12, and 13 when folded flat against the face of the cushion proper at either side thereof, except, however, for the central area defined by the seams 15 which is unpadded. The auxiliary pad may be hinged to the cushion proper by any suitable means and is preferably detachable therefrom. Lacing or snap fasteners may be used and I have here shown a conventional form of lacing 17. When the cushion with the auxiliary pad attached is used in the manner shown in Fig. 1 the auxiliary pad serves to provide support for the lower posterior portion of the body with relief area for the lower portion of the spinal column region. This pad may in some cases be folded forwardly over either the top or the bottom of the cushion proper so as to extend the padded area over the V-shaped area above described, that is, to reduce this area but still leaving a substantial unpadded area between the seams 15. There are no abrupt edges or corners at the boundaries or borders of the padded areas, these edges being gradually tapered as shown in the drawing. The auxiliary pad is particularly beneficial when folded forwardly over the cushion proper at either side thereof and with the cushion positioned so that the pad is on the under side. Here, the auxiliary pad serves as a filler for the widened relief area of the seat cushion proper and at the same time the narrow relief area between the seams 15 of the pad registers with the narrow relief area between the seams 9 of the seat cushion. With this arrangement the supporting area at the posterior end of the cushion is increased or more sharply defined while still providing a widened relief area. Cooperation between the seat cushion and the auxiliary pad by reason of the structural features above noted is, therefore, distinctly beneficial and gives increased utility.

In Fig. 2 I have shown the cushion used as a back rest, in which case the auxiliary pad 14 is folded down in back of the cushion proper so as to give additional support at the high portion of the back and at the same time relieve pressure directly against the spinal portion.

It will be manifest from the foregoing that my invention is useful for a large number of conditions and that the cushion proper need not necessarily be used with the auxiliary pad attached. However, the auxiliary pad cooperates with the structural features of the cushion proper and greatly adds to the utility of the article. It should be manifest also that changes may be made in the shape and proportion of the parts without departing from the spirit and scope of the invention as expressed in the appended claims, in which—

I claim:

1. As an article of manufacture, a cushion corresponding in size and shape with the seat of an ordinary chair, the cushion being divided medially from front to back by a relatively shallow Y-shaped relief area, the narrow portion of said relief area being located at the front of the cushion and extending rearwardly to a point beyond the center of the cushion and the diverging V-shaped portion of said area extending from said point to the rear of the seat, said relief area dividing the cushion into side sections of the same size and shape, each side section being padded to give yielding support, said side sections serving to give support to the body in duplicate areas and to provide definite relief from pressure of the supported body in the area defined by said Y-shaped relief, and an auxiliary cushion pad hinged to the rear edge of the seat cushion of general V-shape and of size corresponding approximately with the size of the V-shaped unpadded portion of the cushion proper and adapted to be folded over the cushion proper and to serve as a filler pad in said V-shaped unpadded portion.

2. As an article of manufacture, a cushion corresponding in size and shape with the seat of an ordinary chair, the cushion being divided medially from front to back by a relatively shallow Y-shaped relief area, the narrow portion of said relief area being located at the front of the cushion and extending rearwardly to a point beyond the center of the cushion and the diverging V-shaped portion of said area extending from said point to the rear of the seat, said relief area dividing the cushion into side sections of the same size and shape, each side section being padded to give yielding support, said side sections serving to give support to the body in duplicate areas and to provide definite relief from pressure of the supported body in the area defined by said Y-shaped relief, and an auxiliary cushion pad hinged to the rear portion of the seat cushion, having sides converging upwardly from the hinged edge and having a narrow unpadded portion medially lengthwise thereof and padded side portions contiguous thereto, the padded side and medial portions of the auxiliary pad being approximately the same shape and size and arranged to fit into the V-shaped unpadded area of the seat cushion when said auxiliary pad is folded against said cushion.

3. An article of the character described comprising a seat cushion corresponding in size and shape with the seat of an ordinary chair, having duplicate padded areas and an interposed relief area disposed centrally of and contiguous to the rear edge, and an auxiliary pad hingedly attached to the cushion along the rear edge of said relief area for providing support to the lower posterior part of the body, said relief area extending forwardly from said rear edge a distance approximately the length of the auxiliary pad, the auxiliary pad being movable on its hinge connection into the relief portion of the cushion and being of substantially the same shape and size as said relief area and serving as a filler therein when the cushion is used as a back rest.

4. As an article of manufacture, a cushion corresponding in size and shape with the seat of an ordinary chair, padded substantially uniformly throughout its area except for a relief area extending centrally from front to back, the relief area being narrow through the front portion and widening substantially at the rear portion, and an auxiliary pad hinged to the rear portion of the seat cushion, the auxiliary pad being of a width and length and shape approximately that of the widened unpadded relief area and adapted to serve as a back rest when disposed in angular relation to the seat cushion and as a filler for the widened relief area when folded down against the seat cushion.

5. As an article of manufacture, a cushion corresponding in size and shape with the seat of an ordinary chair, padded substantially uniformly throughout its area except for a relief area extending centrally from front to back, the relief area being uniformly narrow through the front portion to a medial joint from which it widens substantially at the rear portion, and an auxiliary cushion pad of substantially the same shape and size as the widened portion of the relief area hinged to the rear portion of the seat cushion, padded at its side portions and having a relief area on its rear face extending centrally from front to back adapted to register with the relief area of the seat cushion when the pad is folded against said seat cushion.

6. As an article of manufacture, a seat cushion corresponding in size and shape with the seat of an ordinary chair having padded side portions and an unpadded relief area at the back portion thereof extending forwardly intermediate the padded side portions to a medial point, and an auxiliary pad hinged to the rear portion of the seat cushion, the auxiliary pad being of a width and length and shape approximately that of the relief area of the seat cushion and adapted to serve as a back rest when disposed in angular relation to the seat cushion and as a filler for said relief area when folded down against the seat cushion.

7. As an article of manufacture, a cushion corresponding in size and shape with the seat of an ordinary chair having padded side portions and an unpadded relief area therebetween extending from the back forwardly to a medial point, and an auxiliary cushion pad hinged to the rear portion of the seat cushion, padded at its side portions and having a relief area extending centrally from front to back thereof, said pad serving as a back rest when disposed in angular relation to the seat cushion and the padded side portions and relief area thereof being of a size and shape to substantially fill in the relief area of the cushion proper, and said relief area on its rear face registering in alignment with the central relief area of the cushion proper when the auxiliary pad is folded against the cushion proper.

JOSEPH P. GORDON.